(12) United States Patent
Zhang (10) Patent No.: US 10,773,617 B2
(45) Date of Patent: Sep. 15, 2020

(54) AUTOMOBILE SEAT AND WORKING PRINCIPLE THEREOF AND AUTOMOBILE

(71) Applicant: Langfang Golden Time Technology Development Co., Ltd., Langfeng, Hebei (CN)

(72) Inventor: Haitao Zhang, Hebei (CN)

(73) Assignee: Langfang Golden Time Technology Development Co., Ltd., Langfang, Hebei (CN)

( * ) Notice: Subject to any disclaimer, the term of this patent is extended or adjusted under 35 U.S.C. 154(b) by 0 days.

(21) Appl. No.: 16/089,724

(22) PCT Filed: Feb. 13, 2018

(86) PCT No.: PCT/CN2018/076586
§ 371 (c)(1),
(2) Date: Sep. 28, 2018

(87) PCT Pub. No.: WO2018/171366
PCT Pub. Date: Sep. 27, 2018

(65) Prior Publication Data
US 2020/0001755 A1    Jan. 2, 2020

(30) Foreign Application Priority Data

Mar. 20, 2017  (CN) .......................... 2017 1 0165672

(51) Int. Cl.
*B60N 2/56* (2006.01)
(52) U.S. Cl.
CPC ......... *B60N 2/5657* (2013.01); *B60N 2/5685* (2013.01); *B60N 2/5692* (2013.01)

(58) Field of Classification Search
CPC .. B60N 2/5657; B60N 2/5692; B60N 2/5685; B60N 2/5678; B60N 2/5664
(Continued)

(56) References Cited

U.S. PATENT DOCUMENTS 7,931,330 B2 *  4/2011  Itou ...................... B60N 2/5635
                                                     297/180.14
8,585,137 B2 * 11/2013  Park .................... B60N 2/5642
                                                     297/180.13
(Continued)

FOREIGN PATENT DOCUMENTS

CN           2180514 Y     10/1994
CN         202271879 U      6/2012
(Continued)

*Primary Examiner* — Milton Nelson, Jr.
(74) *Attorney, Agent, or Firm* — Dinsmore & Shohl LLP; Mark D. Schneider; Cesare Sclafani (57) ABSTRACT

An automobile seat and an automobile are provided. The automobile seat comprises a seat cushion and a backrest, and at least one of the seat cushion and the backrest is provided with a temperature adjusting system comprising a temperature adjusting device and a fan (300). In the automobile seat, the traditional heating pad and ventilation device are replaced by providing, in a temperature adjusting system, a fan (300) and a temperature adjusting device formed by serially-connected devices wherein a convertible cooling module (100) and a heating module (200) are connected, thereby achieving the integrated design of ventilation heating and cooling, avoiding the interference between the two sets of devices, thus reduces manufacturing and processing costs.

20 Claims, 3 Drawing Sheets

(58) Field of Classification Search
USPC .......................... 297/180.12, 180.13, 180.14
See application file for complete search history.

(56) References Cited

U.S. PATENT DOCUMENTS

2005/0086739 A1* 4/2005 Wu ..................... A47C 7/744
5/423
2015/0266405 A1* 9/2015 Fitzpatrick ............... B60N 2/56
297/180.12

FOREIGN PATENT DOCUMENTS

| CN | 203005159 U | 6/2013 | | |
|---|---|---|---|---|
| CN | 203637631 U | 6/2014 | | |
| CN | 103946062 A | 7/2014 | | |
| CN | 205615375 U | 10/2016 | | |
| CN | 106956627 A | 7/2017 | | |
| DE | 10316732 A1 * | 10/2004 | ........... | B60N 2/5657 |
| DE | 102013221516 A1 | 4/2015 | | |
| KR | 101280955 B1 | 7/2013 | | |

* cited by examiner

AUTOMOBILE SEAT AND WORKING PRINCIPLE THEREOF AND AUTOMOBILE

CROSS-REFERENCE TO RELATED APPLICATIONS

The present application is a 371 U.S. National Phase of International application No. PCT/CN2018/076586, filed Feb. 13, 2018, which claims priority to Chinese Patent Application No. 201710165672.1, filed with the Chinese Patent Office on Mar. 20, 2017, entitled "Automobile Seat", which is incorporated herein by reference in its entirety.

TECHNICAL FIELD

The present disclosure relates to the technical field of automobile seats, and in particular to an automobile seat and a working principle thereof and an automobile.

BACKGROUND ART

With the development of technologies in the field of vehicle transportation, people are increasingly demanding the comfort of riding in vehicles. A seat is thus designed to have the function of heating in winter and removing sweat in summer, which effectively solves the problem of temperature comfort caused by a change in environmental climate.

A ventilated and comfortable seat with a climate adjusting function has a ventilating seat device with the function of heating a seat surface and cooling to remove sweat, and a seat temperature adjusting device for adjusting the temperature state of the seat in different climatic environments is also increasingly popularized as a new technology, becomes a configuration that is popular with vehicle occupants, and is gradually applied to the field of mid-to-high-end passenger vehicles.

Generally, in such a ventilated seat, a heating pad disposed inside a cover of a breathable (air-permeable) seat surface of the seat is used as a heating device for heating the seat surface to achieve heating up and warming of a seat occupant in winter. Moreover, one or a group of cooling fan devices that blow airflow to the seat surface inside the seat are used to operate under the control of an electronic control unit ECU for temperature adjustment, which can achieve cooling, blowing of wind, and dissipation of heat from the body surface of the seat occupant in summer, so that the body surface of the occupant is sweat-free and cool.

However, when the seat has both of the heating pad and the ventilation and heat dissipation device described above, the mutual interference between the two devices during assembly often becomes a difficult application problem that puzzles the designers. At the same time, the simultaneous provision of two sets of relatively independent seat surface temperature systems also results in a problem of higher cost, which is complained by many automobile manufacturers.

SUMMARY

An object of the present disclosure is to provide an automobile seat to ensure integration of heating with ventilation and heat dissipation, thereby effectively avoiding mutual interference between two sets of devices for heating and for ventilation and heat dissipation.

Another object of the present disclosure is to provide a working principle of an automobile seat, by which it is possible to clearly and completely express a working process of the above-mentioned automobile seat in achieving the heating and ventilation and heat dissipating functions, and highlight the beneficial features of the above-mentioned automobile seat.

Another object of the present disclosure is to provide an automobile provided with the above-mentioned automobile seat, which has various advantages of the above-mentioned automobile seat.

To achieve the above-mentioned objects, the present disclosure provides the following technical solutions:

An automobile seat comprises a seat body comprising a seat cushion and a backrest, wherein at least one of the seat cushion and the backrest is provided with a temperature adjusting system comprising a temperature adjusting device and a fan; the temperature adjusting device comprises a convertible cooling module and a heating module; the convertible cooling module comprises a semiconductor cooler, a first side and a second side of the semiconductor cooler are in temperature-control states with the temperature-control states opposite to each other, a first end of the convertible cooling module is an air inlet, and an end of the second side of the semiconductor cooler that is remote from the air inlet is an exhaust air port; the heating module comprises a heater, the heater is in air-path communication with the first side of the semiconductor cooler and is communicated to a second end of the convertible cooling module, an end of the heating module remote from the convertible cooling module is an air outlet, and the air outlet of the temperature adjusting device is in communication with a position to be subjected to temperature adjustment; and an air outlet of the fan is in communication with the air inlet of the convertible cooling module.

Further, in some embodiments of the present disclosure, each of the seat cushion and the backrest is provided with a temperature adjusting system, and an air outlet of the temperature adjusting system disposed on the seat cushion is in communication with the seat cushion; and an air outlet of the temperature adjusting system disposed on the backrest is in communication with the backrest.

Further, in some embodiments of the present disclosure, the temperature adjusting system comprises one convertible cooling module and one heating module, wherein the convertible cooling module and the heating module are connected in series.

Further, in some embodiments of the present disclosure, the convertible cooling module further comprises cooling module heat sinks disposed on the first side and the second side of the semiconductor cooler.

Further, in some embodiments of the present disclosure, the heating module further comprises heating module heat sinks disposed on both sides of the heater.

Further, in some embodiments of the present disclosure, the heating module heat sink is a metal heat sink; and the cooling module heat sink is a metal heat sink.

Further, in some embodiments of the present disclosure, the temperature adjusting device further comprises: a cooling module housing wrapped around the outside of the convertible cooling module, the semiconductor cooler dividing the cooling module housing into a first passage and a second passage; and a heating module housing wrapped around the outside of the heating module, the heating module housing being in communication with the first passage.

Further, in some embodiments of the present disclosure, a part of the heating module housing is structurally integrated with the cooling module housing, and the other part thereof is connected to the semiconductor cooler.

Further, in some embodiments of the present disclosure, the heating module heat sink is composed of a plurality of small heating heat sinks, and the plurality of small heating heat sinks are arranged in arrays at equal spacing on both sides of the heater.

Further, in some embodiments of the present disclosure, the cooling module heat sink is composed of a plurality of small cooling heat sinks, and the plurality of small cooling heat sinks are arranged in arrays at equal spacing on both sides of the semiconductor cooler.

Further, in some embodiments of the present disclosure, the heater is a ceramic heater, a resistance wire heater, or a graphite heater.

Further, in some embodiments of the present disclosure, the air outlet of the fan is snap-connected with the air inlet of the convertible cooling module.

Further, in some embodiments of the present disclosure, the fan is embeddedly connected to the convertible cooling module.

Further, in some embodiments of the present disclosure, the air outlet of the fan is in communication with the air inlet of the convertible cooling module through a pipeline.

Further, in some embodiments of the present disclosure, the automobile seat further comprises a controller, wherein when the automobile seat is in a cooling mode, the controller controls the first side of the semiconductor cooler, to be in a cooling state, the fan to be turned on, and the heater to be turned off; when the automobile seat is in a first-level heating mode, the semiconductor cooler is controlled by the controller to be turned off, and the heater and the fan to be turned on; or the controller controls the first side of the semiconductor cooler to be in a heating state, the heater to be turned off, and the fan to be turned on; when the automobile seat is in a second-level heating mode, the controller controls the first side of the semiconductor cooler to be in the heating state, and the heater and the fan to be turned on; and when the automobile seat is in a room temperature ventilation mode, the semiconductor cooler is controlled by the controller to be turned off, the heater to be turned off, and the fan to be turned on.

Further, in some embodiments of the present disclosure, the automobile seat further comprises:

a first temperature sensor disposed on the semiconductor cooler and located on the first side or close to the cooling module heat sink on the first side; and a second temperature sensor disposed on the heater or on the heating module heat sink on the heater.

Further, in some embodiments of the present disclosure, the first temperature sensor and the second temperature sensor are thermocouples or bimetallic temperature controllers.

A method for adjusting a temperature of an automobile seat as described above, comprises:

when ventilation and cooling are required, air is blown by the fan from the air inlet, the airflow enters the convertible cooling module, the airflow on the first side of the convertible cooling module is subjected to a temperature decrease and cooled, the airflow on the second side is heated and discharged from the exhaust air port, and the airflow on the first side of the convertible cooling module enters the unpowered heating module and is discharged through the air outlet and blown to an area required to be cooled, such as a seat surface of the seat; and when ventilation and heating are required, air is blown by the fan from the air inlet, the airflow enters the convertible cooling module, the heating module and/or the convertible cooling module operates, the first side is in a heating mode so as to warm the air flow, and the hot airflow is discharged through the air outlet and blown to an area required to be heated, such as the seat surface of the seat.

An automobile is provided with an automobile seat described above.

The automobile seat and the working principle thereof and the automobile provided in the embodiments of the present disclosure have the following beneficial effects:

A temperature adjusting system is added to the automobile seat provided in the present disclosure, a temperature adjusting device of the temperature adjusting system comprises a convertible cooling module and a heating module connected in series, and the temperature adjusting device can achieve the function of heating and cooling the automobile seat, and can achieve both the temperature decrease and cooling of the seat surface and/or the backrest of the seat in summer, and the heating and temperature increase in winter. In the present disclosure, the heating pad and the ventilation device in the prior art are replaced with a device formed by a convertible cooling module and a heating module connected in series, to ensure integration of heating with ventilation and heat dissipation, thereby also avoiding interference between the two sets of devices.

Further, the beneficial effects of the working principle of the automobile seat provided in the embodiment of the present disclosure are embodied as follows: in the summer time, the seat ventilation and cooling function is activated, the air may be blown by the fan from the air inlet, the airflow enters the convertible cooling module, the airflow on the first side of the convertible cooling module is subjected to a temperature decrease and cooled, and the airflow on the second side is heated and discharged from the exhaust air port. The airflow on the first side of the convertible cooling module enters the unpowered heating module and is discharged through the air outlet and blown to an area required to be cooled, such as the seat surface of the seat; in the winter time, the seat ventilation and heating function is activated, the air may be blown by the fan from the air inlet, and the airflow enters the convertible cooling module, at this time, the heating module and/or the convertible cooling module (the first side is in the heating mode) operates. The air flow is warmed, and the hot airflow is discharged through the air outlet and blown to an area required to be heated, such as the seat surface of the seat.

BRIEF DESCRIPTION OF DRAWINGS

For illustrating technical solutions of embodiments of the present disclosure more clearly, drawings required for use in the embodiments will be introduced briefly below. It is to be understood that the drawings below are merely illustrative of some embodiments of the present disclosure, and therefore should not to be considered as limiting the scope of the disclosure. It would be understood by those of ordinary skill in the art that other relevant drawings could also be obtained from these drawings.

Reference numerals: 100—convertible cooling module; 101—semiconductor cooler; 1011—first side; 1012—second side; 102—cooling module heat sink; 103—cooling module housing; 104—first temperature sensor; 200—heating module; 201—heater; 202—heating module heat sink; 203—heating module housing; 204—second temperature sensor; 300—fan.

DETAILED DESCRIPTION OF EMBODIMENTS

In order to make the objects, technical solutions and advantages of the embodiments of the present disclosure more clear, the technical solutions of the embodiments of the present disclosure will be described below clearly and completely with reference to the drawings of the embodiments of the present disclosure. It is apparent that the embodiments to be described are some, but not all of the embodiments of the present disclosure. Generally, the components of the embodiments of the present disclosure, as described and illustrated in the figures herein, may be arranged and designed in a wide variety of different configurations.

Thus, the following detailed description of the embodiments of the present disclosure, as represented in the figures, is not intended to limit the scope of the present disclosure as claimed, but is merely representative of selected embodiments of the present disclosure. All the other embodiments obtained by those of ordinary skill in the art in light of the embodiments of the present disclosure would fall within the scope of the present disclosure as claimed.

It should be noted that similar reference numerals and letters refer to similar items in the following figures, and thus once an item is defined in one figure, it may not be further defined or explained in the following figures.

In the description of the present disclosure, it should be noted that orientation or positional relations indicated by the terms such as "inside", "outside", and "horizontal" are the orientation or positional relations shown based on the figures, or the orientation or positional relations in which the product is conventionally placed in use, and these terms are intended only to facilitate the description of the present disclosure and simplify the description, but not intended to indicate or imply that the referred devices or elements must be in a particular orientation or constructed or operated in the particular orientation, and therefore should not be construed as limiting the present disclosure. In addition, the terms such as "first", "second", and "third" are merely used for distinguishing the description, and should not be understood as an indication or implication of relative importance.

In the description of the present disclosure, it should also be noted that the terms "provided", "mounted", and "connected" should be understood broadly unless otherwise expressly specified or defined. For example, connection may be fixed connection or detachable connection or integral connection, may be mechanical connection or electric connection, or may be direct coupling or indirect coupling via an intermediate medium or internal communication between two elements. The specific meanings of the above-mentioned terms in the present disclosure could be understood by those of ordinary skill in the art according to specific situations.

The core of the present disclosure is to provide an automobile seat to ensure integration of heating with ventilation and heat dissipation to avoid interference between two sets of devices.

Figure 1:
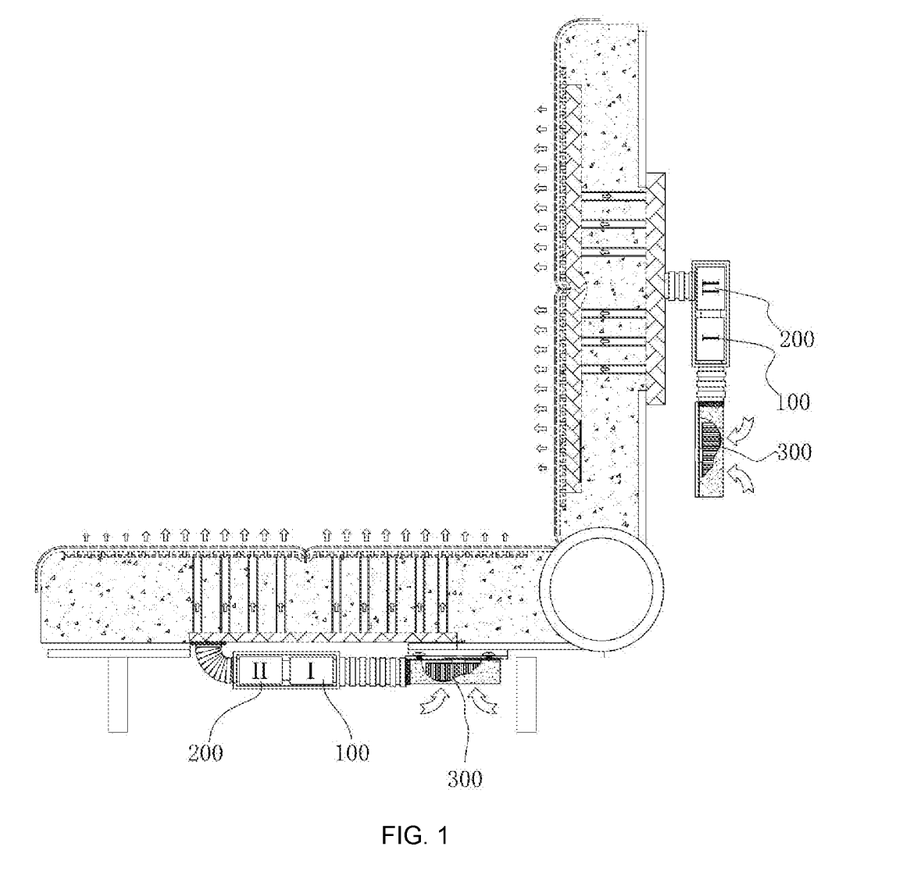
FIG. 1 is a schematic structural diagram of an automobile seat according to an embodiment of the present disclosure.
Figure 2:
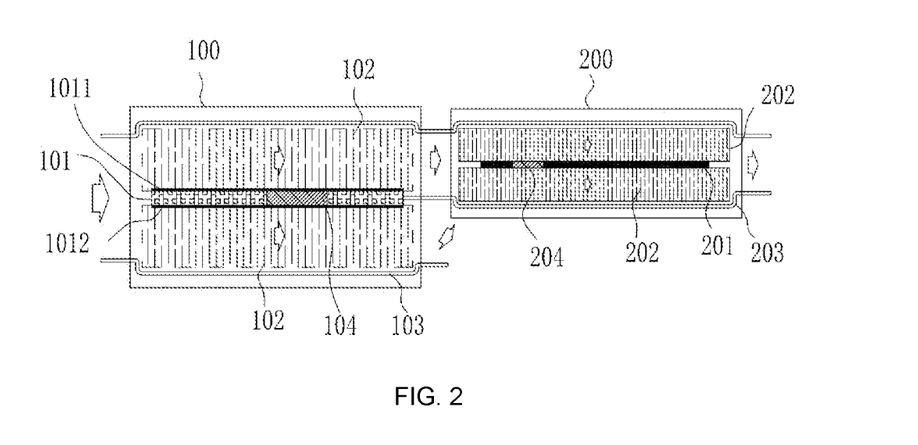
FIG. 2 is a schematic structural diagram of a temperature adjusting device according to an embodiment of the present disclosure.
Figure 3:
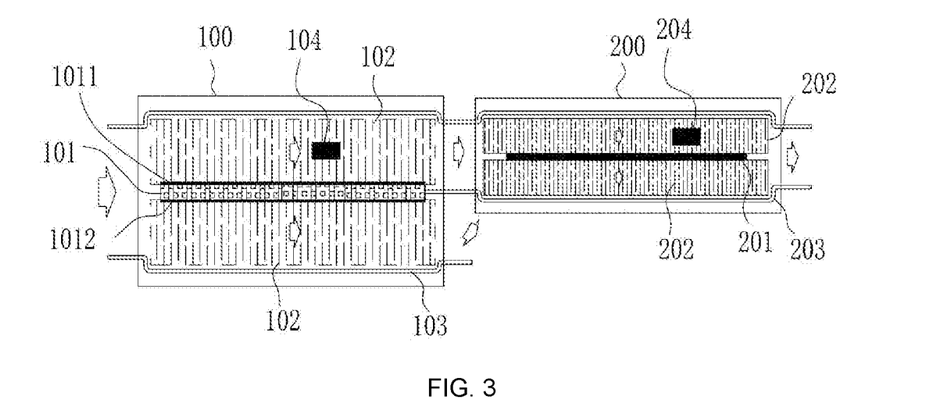
FIG. 3 is a schematic structural diagram of a temperature adjusting device according to another embodiment of the present disclosure.
Figure 4:
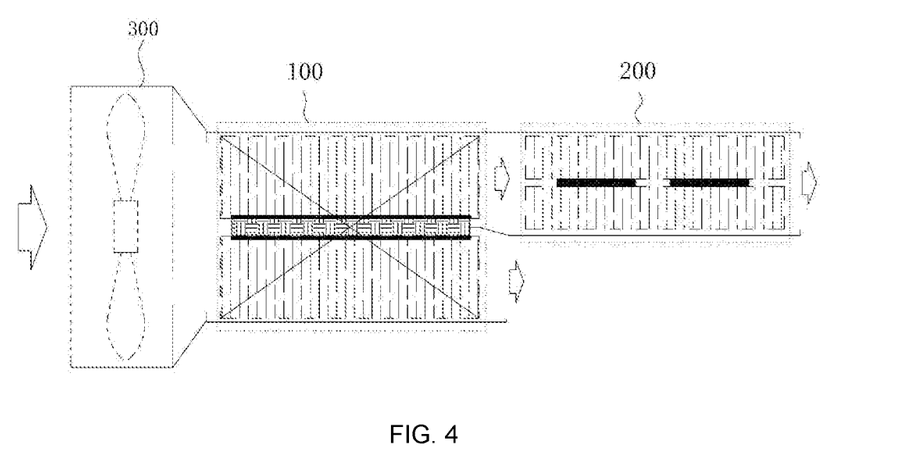
FIG. 4 is a schematic structural diagram of a temperature adjusting system according to an embodiment of the present disclosure.

Specifically, referring to FIGS. 1 to 4, FIG. 1 is a schematic structural diagram of an automobile seat according to an embodiment of the present disclosure; FIG. 2 is a schematic structural diagram of a temperature adjusting device according to an embodiment of the present disclosure; FIG. 3 is a schematic structural diagram of a temperature adjusting device according to another embodiment of the present disclosure; and FIG. 4 is a schematic structural diagram of a temperature adjusting system according to an embodiment of the present disclosure.

An automobile seat provided in an embodiment of the present disclosure comprises a seat body comprising a seat cushion and a backrest, wherein at least one of the seat cushion and the backrest is provided with a temperature adjusting system, the temperature adjusting system comprises a temperature adjusting device and a fan 300, and the temperature adjusting device comprises a convertible cooling module 100 and a heating module 200.

Here, the convertible cooling module 100 comprises a semiconductor cooler 101, the semiconductor cooler 101 has cooling and heating functions of a Peltier effect, and can switch electrodes, that is, convert positive and negative electrodes, to achieve alternation of the cooling and heating functions, and also a change of a working surface from the cooling to heating function, that is to say, a first side 1011 and a second side 1012 of the semiconductor cooler 101 are in temperature-control states with the temperature-control states opposite to each other, for example, when the first side 1011 of the semiconductor cooler 101 is in a cooling state, the second side 1012 is in a heating state; and conversely, when the first side 1011 of the semiconductor cooler 101 is in the heating state, the second side 1012 is in the cooling state. An airflow is divided into two parts by a working surface (first side 1011) and a non-working surface (second side 1012) of the semiconductor cooler 101, and a branch airflow at the working surface is used as a working airflow and flows to the direction of the heating module 200. A branch airflow at the non-working surface is used as an exhaust airflow and is discharged directly into the space inside a passenger compartment.

A first end of the convertible cooling module 100 is an air inlet which is connected to a fan 300 and from which the wind blown by the fan enters the temperature adjusting device, and an end of the second side 1012 of the semiconductor cooler 101 that is remote from the air inlet is an exhaust air port which is not connected to a position to be subjected to temperature adjustment. Taking a ventilated seat as an example, the exhaust air port is not connected to the seat and may be in direct communication with the passenger compartment.

The heating module 200 comprises a heater 201, and the heater 201 is in air-path communication with the first side 1011 of the semiconductor cooler 101 and is communicated to a second end of the convertible cooling module 100. Since the two sides of the semiconductor cooler 101 are in temperature-control states with the temperature-control states opposite to each other, only one side of them can be utilized, in the present embodiment, the heater 201 is in air-path communication with the first side 1011 of the semiconductor cooler 101. An end of the heating module 200 remote from the convertible cooling module 100 is an air outlet which is in communication with the position to be subjected to temperature adjustment.

The convertible cooling module 100 may be constituted by one or more semiconductor coolers 101, and the heating module 200 may also be constituted by one or more heaters 201. The number of the semiconductor coolers 101 and the number of the heaters 201 are not limited in the present disclosure.

It should be noted that the heating module 200 may also adopt the heating principle of the semiconductor cooler, but it in cost is wasteful, and the system of the module will have a greatly reduced wind transmission efficiency due to the separation of wind by the temperature-regulating working surface and the non-working surface of the semiconductor cooler.

The air outlet of the fan 300 is in communication with the air inlet of the convertible cooling module 100. The fan 300 is used for supplying an airflow to the temperature adjusting device, so that the airflow at room temperature blown by the fan 300 is blown to the position to be subjected to temperature adjustment after heat exchange with the temperature adjusting device. Since the temperature adjusting device disclosed in the embodiment described above is employed, all the technical effects of the temperature adjusting device described above are included, and are not described repeatedly herein.

A temperature adjusting system is added to the automobile seat provided in the present disclosure, wherein a temperature adjusting device of the temperature adjusting system comprises a convertible cooling module 100 and a heating module 200 connected in series, and the temperature adjusting device can achieve the function of heating and cooling the automobile seat, and can achieve both the temperature decrease and cooling of the seat surface and/or the backrest of the seat in summer, and the heating and temperature increase in winter. In the present disclosure, the heating pad and the ventilation device in the prior art are replaced with a device formed by a convertible cooling module and a heating module connected in series, to ensure integration of heating with ventilation and heat dissipation, thereby also avoiding interference between the two sets of devices.

Further, the automobile seat provided in the present embodiment performs temperature adjustment based on the following working principle:

In the summer time (which can be considered as a period when ventilation and cooling are required), the seat ventilation and cooling function is activated, the air may be blown by the fan 300 from the air inlet, the airflow enters the convertible cooling module 100, the airflow on the first side 1011 of the convertible cooling module 100 is subjected to a temperature decrease and cooled, and the airflow on the second side 1012 is heated and discharged from the exhaust air port. The airflow on the first side 1011 of the convertible cooling module 100 enters the unpowered heating module 200 and is discharged through the air outlet and blown to an area required to be cooled, such as the seat surface of the seat.

In the winter time (which can be considered as a period when ventilation and heating are required), the seat ventilation and heating function is activated, the air may be blown by the fan from the air inlet, and the airflow enters the convertible cooling module 100, at this time, the heating module 200 and/or the convertible cooling module 100 (the first side 1011 is in the heating mode) operates. The air flow is warmed, and the hot airflow is discharged through the air outlet and blown to an area required to be heated, such as the seat surface of the seat.

Further, in a specific embodiment of the present disclosure, each of the seat cushion and the backrest is provided with a temperature adjusting system, and an air outlet of the temperature adjusting system disposed on the seat cushion is in communication with the seat cushion; and an air outlet of the temperature adjusting system disposed on the backrest is in communication with the backrest, that is to say, the seat cushion and the backrest are corresponding to their own temperature adjusting systems, respectively.

Further, in an embodiment of the present disclosure, the convertible cooling module 100 further comprises cooling module heat sinks 102 disposed on the first side 1011 and the second side 1012 of the semiconductor cooler 101, and the cooling module heat sink 102 is a metal heat sink, and it should be noted that it may also be made of other materials that facilitate heat dissipation. In the present disclosure, since the cooling module heat sinks 102 are disposed on both sides of the semiconductor cooler 101, heat exchange can be quickly performed between the both sides of the semiconductor cooler 101 and the surrounding air, thereby achieving the purpose of adjusting the temperature with high efficiency. It should be noted that the arrangement of the cooling module heat sink 102 should facilitate the flow of air, the cooling module heat sink 102 provided in the present embodiment is composed of a plurality of small cooling heat sinks, and the plurality of small cooling heat sinks are arranged in arrays at equal spacing on both sides of the semiconductor cooler 101.

Further, in a specific embodiment of the present disclosure, the heating module 200 further comprises heating module heat sinks 202 disposed on both sides of the heater 201. The heating module heat sink 202 is a metal heat sink, and it should be noted that it may also be made of other materials that facilitate heat dissipation. In the present disclosure, since the heating module heat sinks 202 are disposed on both sides of the heater 201, heat exchange can be quickly performed between the both sides of the heater 201 and the surrounding air, thereby achieving the purpose of adjusting the temperature with high efficiency. It should be noted that the arrangement of the heating module heat sink 202 should facilitate the flow of air, the heating module heat sink 202 provided in the present embodiment is composed of a plurality of small heating heat sinks, and the plurality of small heating heat sinks are arranged in arrays at equal spacing on both sides of the heater 201.

Further, in a specific embodiment of the present disclosure, the temperature adjusting device disclosed in the present disclosure may further comprise a cooling module housing 103 and a heating module housing 203. Here, the cooling module housing 103 is wrapped around the outside of the convertible cooling module 100, and the semiconductor cooler 101 separates the cooling module housing 103 into a first passage and a second passage. The heating module housing 203 is wrapped around the outside of the heating module 200, and the heating module housing 203 is in communication with the first passage, and air in the second passage is discharged through the exhaust air port. In the present disclosure, a passage for flow of air is formed by the cooling module housing 103 and the heating module housing 203, which can greatly reduce the volume of the temperature adjusting device to facilitate the installation of the temperature adjusting device. It should be noted that the passage for flow of air may also be implemented by a pipeline.

Further, a part of the heating module housing 203 is structurally integrated with the cooling module housing 103, that is to say, the heating module housing 203 may share a partial housing with the cooling module housing 103.

Since the heating module housing 203 is only in communication with the first passage, the housing cannot be completely shared, and thus the other part (a part that cannot be shared) of the heating module housing 203 is connected to the semiconductor cooler 101.

Further, in a specific embodiment of the present disclosure, the heater 201 is a ceramic heater, a resistance wire heater, or a graphite heater.

Further, in a specific embodiment of the present disclosure, the air outlet of the fan 300 is snap-connected with the air inlet of the convertible cooling module 100, or the fan 300 is embeddedly connected to the convertible cooling module 100, so that the fan 300 is integrated together with the convertible cooling module 100, which can greatly reduce the volume of the temperature adjusting system and save the arrangement space inside the seat. It should be noted that the air outlet of the fan 300 may also be in communication with the air inlet of the convertible cooling module 100 through a pipeline.

Further, in a specific embodiment of the present disclosure, the automobile seat further comprises:

a first temperature sensor 104 disposed on the semiconductor cooler 101 and located on the first side 1011 or close to the cooling module heat sink 102 on the first side 1011, the first temperature sensor 104 being used for detecting the temperature of the first side of the semiconductor cooler 101; and a second temperature sensor 204 disposed on the heater 201 or on the heating module heat sink 202 on the heater 201, the second temperature sensor 204 being used for detecting the temperature of the heater 201.

Further, in some embodiments of the first temperature sensor 104 and the second temperature sensor 204 may be thermocouples or bimetallic temperature controllers.

Further, in a specific embodiment of the present disclosure, the automobile seat may further comprise a controller.

Figure 5:
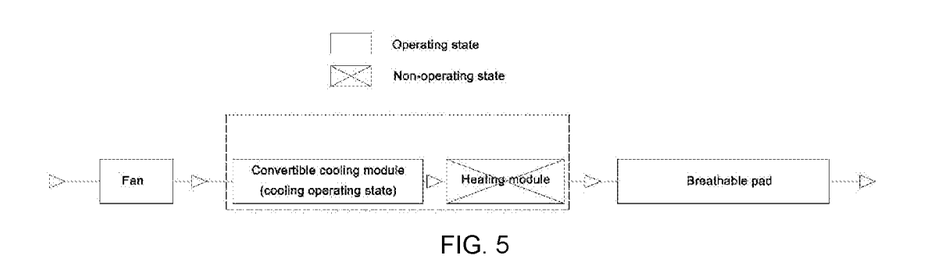
FIG. 5 is a structural block diagram of a temperature adjusting device in a cooling mode according to an embodiment of the present disclosure.

As shown in FIG. 5, when the temperature adjusting system is in a cooling mode, the controller controls the first side 1011 of the semiconductor cooler 101, to be in a cooling state, the fan 300 to be turned on, and the heater 201 to be turned off. An airflow at room temperature is blown from the air outlet of the fan 300 into the convertible cooling module 100, and the airflow is divided into two parts by the temperature-regulating working surface (the first side 1011) and the non-working surface (the second side 1012) of the convertible cooling module 100, the branch airflow of the temperature-regulating working surface is respectively used as a working airflow, at this time, the temperature-regulating working surface of the convertible cooling module 100 generates a cold working airflow subjected to a temperature decrease and cooled, which flows through the unoperated heating module 200, and continues to pass through a wind-path connecting duct and into a breathable pad (a breathable pad on the seat cushion or backrest, wherein the temperature adjusting system is in communication with the breathable pad on the seat cushion or backrest depending on a different position where it is located, it will be introduced hereinafter as the breathable pad, and it is no longer explained whether it is specifically a breathable pad on the seat cushion or on the backrest), the cold working airflow is distributed in relatively uniform flow directions inside the breathable pad, and passes through the breathable seat cover, and the cold working airflow finally flows out of the surface of the seat. At the same time, the exhaust airflow on the non-working surface side of the convertible cooling module 100 has been heated under the action of the Peltier effect, and the hot exhaust airflow is directly discharged to the outside of the air path upstream of the heating module 200 and directly flows into the space inside the passenger compartment.

Figure 6:
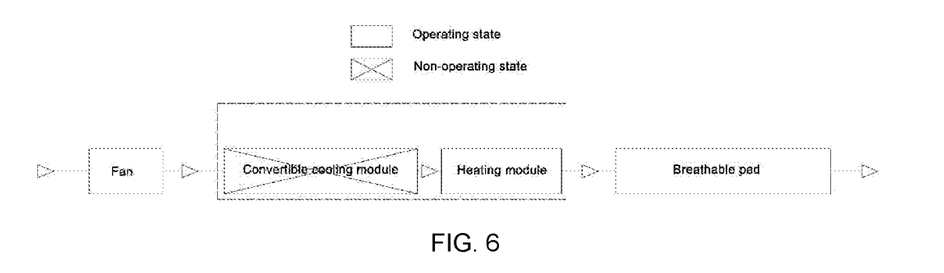
FIG. 6 is a structural block diagram of a temperature adjusting device in a first-level heating mode according to an embodiment of the present disclosure.

As shown in FIG. 6, when the temperature adjusting system is in a first-level heating mode, the semiconductor cooler 101 is controlled by the controller to be turned off, and the heater 201 and the fan 300 to be turned on. An airflow at room temperature is blown from the air outlet of the fan 300 into the convertible cooling module 100, and the convertible cooling module 100 does not operate. At this time, the airflow flowing through the temperature-regulating working surface (the first side 1011) of the convertible cooling module 100 does not undergo a temperature change, and the working airflow at room temperature flows into the heating module 200 which has operated at this time, where the airflow is heated and subjected to a temperature increase. The heated warm working airflow continues to pass through a wind-path connecting duct and into the breathable pad, and the warm working airflow is distributed in relatively uniform flow directions inside the breathable pad, and passes through the breathable seat cover, and the warm working airflow finally flows out of the surface of the seat. At this time, the exhaust airflow on the non-working surface side of the convertible cooling module 100 is at room temperature, and is discharged to the outside of the air path upstream of the heating module 200 and directly flows into the space inside the passenger compartment.

Figure 7:
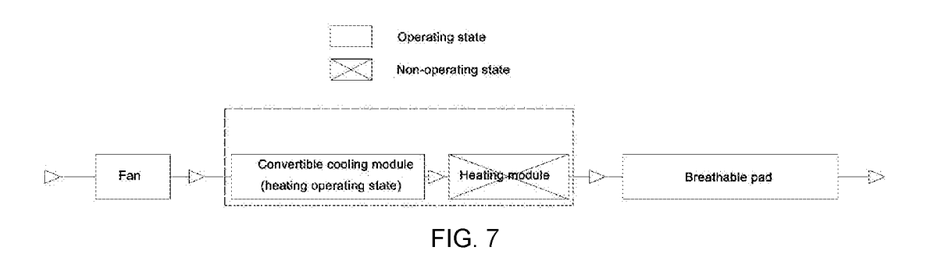
FIG. 7 is a structural block diagram of a temperature adjusting device in a first-level heating mode according to another embodiment of the present disclosure.

As shown in FIG. 7, when the temperature adjusting system is in the first-level heating mode, the controller may also control the first side 1011 of the semiconductor cooler 101 to be in a heating state, the heater 201 to be turned off, and the fan 300 to be turned on. An airflow at room temperature is blown from the air outlet of the fan 300 into the convertible cooling module 100. At this time, the convertible cooling module 100 is in a heating operating mode. First, the airflow flows through the temperature-regulating working surface (the first side 1011) for heating and is heated and subjected to a temperature increase, the preheated warm working airflow flows into the heating module 200 and into the breathable pad, and the warm working airflow is distributed in relatively uniform flow directions inside the breathable pad, and passes through the breathable seat cover, and the warm working airflow finally flows out of the surface of the seat. At this time, the exhaust airflow on the non-working surface side of the convertible cooling module 100 is in a cooled state, and is discharged to the outside of the air path upstream of the heating module 200 and directly flows into the space inside the passenger compartment.

Figure 8:
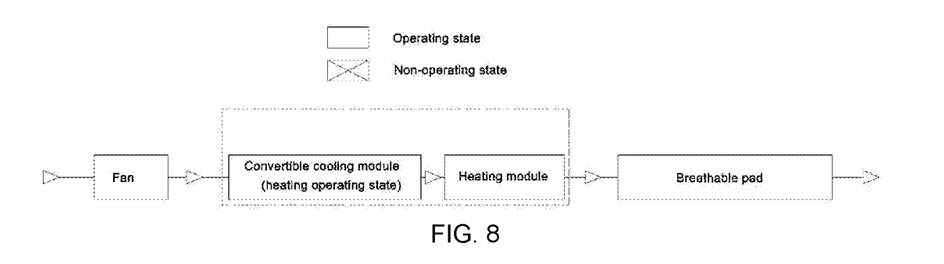
FIG. 8 is a structural block diagram of a temperature adjusting device in a second-level heating mode according to an embodiment of the present disclosure.

As shown in FIG. 8, when the temperature adjusting system is in a second-level heating mode, the controller controls the first side 1011 of the semiconductor cooler 101 to be in the heating state, and the heater 201 and the fan 300 to be turned on. An airflow at room temperature is blown from the air outlet of the fan 300 into the convertible cooling module 100. At this time, the convertible cooling module 100 is in the heating operating mode. First, the airflow flows through the temperature-regulating working surface (the first side 1011) for heating and is heated and subjected to a temperature increase, the preheated warm working airflow flows into the heating module 200 which has also operated at this time, where the warm airflow is further heated and subjected to a temperature increase again. The hot working airflow which has been heated for the second time continues to pass through a wind-path connecting duct and into the breathable pad, and the hot working airflow is distributed in relatively uniform flow directions inside the breathable pad, and passes through the breathable seat cover, and the hot working airflow finally flows out of the surface of the seat. At this time, the exhaust airflow on the non-working surface side of the convertible cooling module 100 has been heated under the action of the Peltier effect, and the hot exhaust airflow is directly discharged to the outside of the air path upstream of the heating module 200 and directly flows into the space inside the passenger compartment.

It can be understood that this second-level heating mode can greatly expand the seat surface heating performance and effect of the ventilation heating seat, and achieve the efficiency of heating the automobile seat and the body of the passenger under a lower-temperature geographical environment in winter, such as under a low temperature environment near the polar region of the earth.

Figure 9:
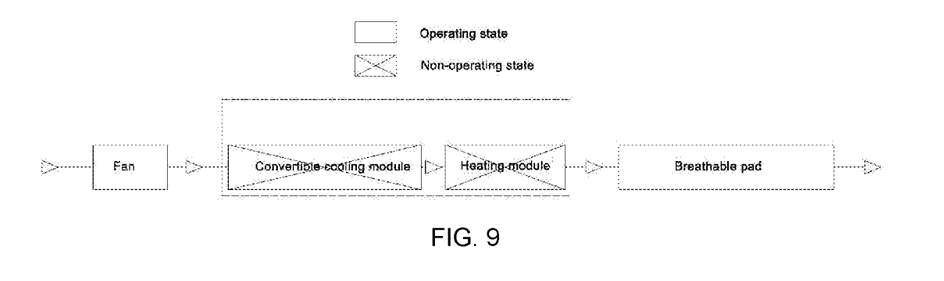
FIG. 9 is a structural block diagram of a temperature adjusting device in a room temperature ventilation mode according to an embodiment of the present disclosure.

As shown in FIG. 9, when the temperature adjusting system is in a room temperature ventilation mode, the semiconductor cooler 101 is controlled by the controller to be turned off, the heater 201 to be turned off, and the fan 300 to be turned on. When the fan 300 is in operation, both the convertible cooling module 100 and the heating module 200 are stopped operating, and it is also allowed to blow natural air at room temperature that is not heated or cooled from the seat surface. This function can satisfy seat occupants who desire natural wind blowing from the seat surface in summer.

An embodiment of the present disclosure also provides an automobile provided with a seat which is an automobile seat described above in the present disclosure. It should be noted that with the arrangement of the above-mentioned automobile seat in an automobile, the occupant can ride in the automobile in more comfort, and mutual interference between two sets of devices for heating and for ventilation and heat dissipation is effectively avoided, and the cost of the automobile seat is greatly reduced by means of integrated design, so that the above-mentioned automobile seat and the automobile provided with the automobile seat show good value of popularization and application in the market.

In this specification, the various embodiments are described in a progressive manner, the description in each embodiment focuses on differences from other embodiments, and the same or similar parts among the various embodiments may be cross-referenced.

The above description of the disclosed embodiments is provided to enable those skilled in the art to implement or use the present disclosure. Various modifications to these embodiments will be obvious to those skilled in the art, and the generic principles defined herein may be implemented in other embodiments without departing from the spirit or scope of the present disclosure. Thus, the present disclosure is not intended to be limited to the embodiments shown herein, but is to be accorded the widest scope consistent with the principles and novel features disclosed herein.

INDUSTRIAL APPLICABILITY

The automobile seat and the working principle thereof and the automobile provided in the present disclosure can not only effectively solve the problem of mutual interference between two sets of devices for heating and for ventilation and heat dissipation on the seat, but also can reduce the cost of the automobile seat by means of integrated design, therefore the present disclosure has important popularization and application value.

The invention claimed is:

1. An automobile seat comprising a seat body comprising a seat cushion and a backrest, wherein at least one of the seat cushion and the backrest is provided with a temperature adjusting system comprising a temperature adjusting device and a fan;
    the temperature adjusting device comprises a convertible cooling module and a heating module;
    the convertible cooling module comprises a semiconductor cooler, a first side and a second side of the semiconductor cooler are in temperature-control states with the temperature-control states opposite to each other, a first end of the convertible cooling module is an air inlet, and an end of the second side of the semiconductor cooler that is remote from the air inlet is an exhaust air port;
    the heating module comprises a heater, the heater is in air-path communication with the first side of the semiconductor cooler and is communicated to a second end of the convertible cooling module, an end of the heating module remote from the convertible cooling module is an air outlet, and the air outlet of the temperature adjusting device is in communication with a position to be subjected to temperature adjustment; and
    an air outlet of the fan is in communication with the air inlet of the convertible cooling module.

2. The automobile seat according to claim 1, wherein each of the seat cushion and the backrest is provided with a temperature adjusting system, and an air outlet of the temperature adjusting system disposed on the seat cushion is in communication with the seat cushion; and
    an air outlet of the temperature adjusting system disposed on the backrest is in communication with the backrest.

3. The automobile seat according to claim 2, wherein the temperature adjusting system comprises one convertible cooling module and one heating module, wherein the convertible cooling module and the heating module are connected in series.

4. The automobile seat according to claim 2, further comprising:
    a first temperature sensor which is disposed on the semiconductor cooler, and located on the first side or close to the cooling module heat sink on the first side; and
    a second temperature sensor disposed on the heater or on the heating module heat sink on the heater.

5. The automobile seat according to claim 1, wherein the convertible cooling module further comprises cooling module heat sinks disposed on the first side and the second side of the semiconductor cooler.

6. The automobile seat according to claim 5, wherein the heating module further comprises heating module heat sinks disposed on both sides of the heater.

7. The automobile seat according to claim 6, wherein the temperature adjusting device further comprises: a cooling module housing wrapped around outside of the convertible cooling module, the semiconductor cooler dividing the cooling module housing into a first passage and a second passage; and
    a heating module housing wrapped around outside of the heating module, the heating module housing being in communication with the first passage.

8. The automobile seat according to claim 7, wherein a part of the heating module housing is structurally integrated with the cooling module housing, and the other part thereof is connected to the semiconductor cooler.

9. The automobile seat according to claim 6, wherein the heating module heat sink is composed of a plurality of small heating heat sinks, and the plurality of small heating heat sinks are arranged in arrays at equal spacing on both sides of the heater.

10. The automobile seat according to claim 6, wherein the heating module heat sink is a metal heat sink; and
the cooling module heat sink is a metal heat sink.

11. The automobile seat according to claim 5, wherein the cooling module heat sink is composed of a plurality of small cooling heat sinks, and the plurality of small cooling heat sinks are arranged in arrays at equal spacing on both sides of the semiconductor cooler.

12. The automobile seat according to claim 1, wherein the air outlet of the fan is snap-connected with the air inlet of the convertible cooling module.

13. The automobile seat according to claim 1, wherein the fan is embeddedly connected to the convertible cooling module.

14. The automobile seat according to claim 1, wherein the air outlet of the fan is in communication with the air inlet of the convertible cooling module through a pipeline.

15. The automobile seat according to claim 14, further comprising a controller, wherein when the automobile seat is in a cooling mode, the first side of the semiconductor cooler is controlled by the controller to be in a cooling state, the fan to be turned on, and the heater to be turned off;
when the automobile seat is in a first-level heating mode, the semiconductor cooler is controlled by the controller to be turned off, and the heater and the fan to be turned on, or the first side of the semiconductor cooler is controlled by the controller to be in a heating state, the heater to be turned off, and the fan to be turned on;
when the automobile seat is in a second-level heating mode, the first side of the semiconductor cooler is controlled by the controller to be in the heating state, and the heater and the fan to be turned on; and
when the automobile seat is in a room temperature ventilation mode, the semiconductor cooler is controlled by the controller to be turned off, the heater to be turned off, and the fan to be turned on.

16. The automobile seat according to claim 1, further comprising:
a first temperature sensor which is disposed on the semiconductor cooler, and located on the first side or close to the cooling module heat sink on the first side; and
a second temperature sensor disposed on the heater or on the heating module heat sink on the heater.

17. The automobile seat according to claim 16, wherein the first temperature sensor and the second temperature sensor are thermocouples or bimetallic temperature controllers.

18. The automobile seat according to claim 1, wherein the heater is a ceramic heater, a resistance wire heater, or a graphite heater.

19. A method for adjusting a temperature of the automobile seat according to claim 1,
wherein when ventilation and cooling are required, air is blown by the fan from the air inlet, the airflow enters the convertible cooling module, the airflow on the first side of the convertible cooling module is subjected to a temperature decrease and cooled, the airflow on the second side is heated and discharged from the exhaust air port, and the airflow on the first side of the convertible cooling module enters the unpowered heating module and is discharged through the air outlet and blown to an area required to be cooled, which is a seat surface of the seat; and
when ventilation and heating are required, air is blown by the fan from the air inlet, the airflow enters the convertible cooling module, the heating module and/or the convertible cooling module operates, the first side is in a heating mode so as to warm the air flow, and the hot airflow is discharged through the air outlet and blown to an area required to be heated, which is the seat surface of the seat.

20. An automobile, wherein the automobile is provided with the automobile seat according to claim 1.

* * * * *